(12) United States Patent
Yu (10) Patent No.: US 12,431,733 B2
(45) Date of Patent: Sep. 30, 2025

(54) SYSTEMS AND METHODS FOR CONTROLLING POWER DEVICES (71) Applicant: SCHNEIDER ELECTRIC IT CORPORATION, Foxboro, MA (US)

(72) Inventor: Qinghong Yu, Carlisle, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 36 days.

(21) Appl. No.: 18/589,625

(22) Filed: Feb. 28, 2024

(65) Prior Publication Data
US 2025/0273985 A1 Aug. 28, 2025

(51) Int. Cl.
H02J 9/06 (2006.01)
H02J 3/32 (2006.01)

(52) U.S. Cl.
CPC ............. *H02J 9/062* (2013.01); *H02J 3/32* (2013.01); *H02J 2203/10* (2020.01)

(58) Field of Classification Search
CPC ........... H02J 9/062; H02J 3/32; H02J 2203/10
USPC .......................................................... 307/64
See application file for complete search history.

(56) References Cited

U.S. PATENT DOCUMENTS

| 7,638,899 B2 * | 12/2009 | Tracy .................... H02M 7/493 307/64 |
| 9,236,768 B2 | 1/2016 | Giuntini et al. |
| 9,685,820 B2 | 6/2017 | Kolhatkar et al. |
| 10,418,849 B2 | 9/2019 | Grehan et al. |
| 11,355,956 B1 | 6/2022 | Ingemi et al. |
| 2010/0308661 A1 | 12/2010 | Garcia et al. |
| 2011/0278932 A1 | 11/2011 | Navarro et al. |
| 2024/0006911 A1 | 1/2024 | Imanishi et al. |

FOREIGN PATENT DOCUMENTS

| CN | 106849720 B | 12/2017 |
| EP | 2798721 B1 | 6/2018 |

OTHER PUBLICATIONS

Extended European Search Report from corresponding European Application No. 25157925.6 dated Jul. 8, 2025.

* cited by examiner

Primary Examiner — Richard Tan
(74) Attorney, Agent, or Firm — Lando & Anastasi, LLP (57) ABSTRACT Examples of the disclosure include a power system including a first device having a first converter and a first DC bus, a second device having a second converter and a second DC bus, an output coupled to a load, and at least one controller configured to control, in a mains mode, the first device to be in an active state, control the first converter to maintain the first DC bus at an active voltage in the active state of the first device, control, in the mains mode, the second device to be in a standby state, control the second converter to maintain the second DC bus at a standby voltage higher than the active voltage in the standby state of the second device, and control the second converter to transition to the active state responsive to initiating a transition from the mains mode to a backup mode.

20 Claims, 5 Drawing Sheets

SYSTEMS AND METHODS FOR CONTROLLING POWER DEVICES

BACKGROUND

1. Field of the Disclosure

At least one example in accordance with the present disclosure relates generally to power devices.

2. Discussion of Related Art

Power devices, such as uninterruptible power supplies (UPSs) or individual power modules within a UPS, may be used to provide regulated, uninterrupted power for sensitive and/or critical loads, such as computer systems and other data-processing systems. Examples of UPSs include online UPSs, offline UPSs, line-interactive UPSs, as well as others. UPSs may provide output power to a load. The output power may be derived from a primary source of power, such as a utility-mains source, and/or derived from a back-up source of power, such as an energy-storage device.

SUMMARY

According to at least one aspect of the present disclosure a power system comprising a first power device having a first converter and a first DC bus, a second power device having a second converter and a second DC bus, the second power device being coupled in parallel with the first power device, an output configured to be coupled to a load, and at least one controller configured to control, in a mains mode of operation, the first power device to be in an active state, control the first converter to maintain the first DC bus at an active voltage in the active state of the first power device, control, in the mains mode of operation, the second power device to be in a standby state, control the second converter to maintain the second DC bus at a standby voltage higher than the active voltage in the standby state of the second power device, and control the second converter to transition from the standby state to the active state responsive to initiating a transition from the mains mode of operation to a backup mode of operation.

In at least one example, the first power device is a first uninterruptible power supply (UPS) and the second power device is a second UPS. In at least one example, the power system includes at least one uninterruptible power supply including the first power device and the second power device, wherein the first power device is a first power module and the second power device is a second power module. In at least one example, the power system includes a plurality of relays including: a first relay configured to be switchably coupled to an AC mains at a first respective connection, to be switchably coupled to at least one energy-storage device at a second respective connection, and to be coupled to the first power device at a third respective connection, and a second relay configured to be switchably coupled to the AC mains at a first respective connection, to be switchably coupled to at least one energy-storage device at a second respective connection, and to be coupled to the second power device at a third respective connection.

In at least one example, the at least one controller is configured to control the plurality of relays to couple the AC mains to the first power device and the second power device during the mains mode of operation. In at least one example, the first power device includes a first inverter and the second power device includes a second inverter, and wherein the at least one controller is further configured to: control, in the mains mode of operation, the first inverter to provide output power to the load in the active state, control, in the mains mode of operation, the second inverter to decouple the second DC bus from the load in the standby state, transition from the mains mode of operation to the backup mode of operation, control, responsive to initiating a transition to the backup mode of operation, the plurality of relays to transition from coupling the AC mains to the first converter and the second converter to coupling the at least one energy-storage device to the first converter and the second converter, and control, responsive to controlling the plurality of relays to transition, the second inverter to be in the active state and provide output power to the load.

In at least one example, the at least one controller is further configured to control, responsive to controlling the plurality of relays to transition, the first inverter to be in the standby state and decouple the first DC bus from the load. In at least one example, the first power device includes a first inverter and the second power device includes a second inverter, and wherein the at least one controller is further configured to: control, in the mains mode of operation, the first inverter to provide output power to the load in the active state, and control, in the mains mode of operation, the second inverter to decouple the second DC bus from the load in the standby state. In at least one example, controlling the first inverter to be in the active state includes controlling one or more switching devices of the first inverter to draw DC power from the first DC bus and provide output AC power derived from the DC power to the load.

In at least one example, the power system includes a plurality of relays switchably coupled to a first input power source and a second input power source, wherein the at least one controller is further configured to control the first inverter to be in the standby state responsive to controlling the plurality of relays to switch from the first input power source to the second input power source. In at least one example, the at least one controller is further configured to control the second inverter to be in the active state responsive to controlling the plurality of relays to switch from the first input power source to the second input power source.

Examples of the disclosure include at least one non-transitory computer-readable medium storing thereon sequences of computer-executable instructions for controlling a power system comprising a first power device having a first converter and a first DC bus and a second power device having a second converter and a second DC bus, the second power device being coupled in parallel with the first power device, the sequences of computer-executable instructions including instructions that instruct at least one processor to control, in a mains mode of operation, the first power device to be in an active state, control the first converter to maintain the first DC bus at an active voltage in the active state of the first power device, control, in the mains mode of operation, the second power device to be in a standby state, control the second converter to maintain the second DC bus at a standby voltage higher than the active voltage in the standby state of the second power device, and control the second converter to transition from the standby state to the active state responsive to initiating a transition from the mains mode of operation to a backup mode of operation.

In at least one example, the power system further includes a plurality of relays including a first relay coupled to the first power device and switchably coupled to an AC mains and at least one energy-storage device and a second relay coupled to the second power device and switchably coupled to the AC mains and the least one energy-storage device, and the instructions further instruct the at least one processor to control the plurality of relays to couple the AC mains to the first power device and the second power device during the mains mode of operation.

In at least one example, the first power device further includes a first inverter and the second power device further including a second inverter, the power system further comprising a plurality of relays coupled to the first power device and the second power device and each switchably coupled to an AC mains and at least one energy-storage device, and the instructions further instruct the at least one processor to: control, in the mains mode of operation, the first inverter to be in an active state and provide output power to a load, control, in the mains mode of operation, the second inverter to be in a standby state and not provide output power to the load, transition from the mains mode of operation to a backup mode of operation, control, responsive to initiating a transition to the backup mode of operation, the plurality of relays to transition from coupling the AC mains to the first converter and the second converter to coupling the at least one energy-storage device to the first converter and the second converter, and control, responsive to controlling the plurality of relays to transition, the second inverter to be in the active state and provide output power to the load.

In at least one example, the instructions further instruct the at least one processor to control, responsive to controlling the plurality of relays to transition, the first inverter to be in the standby state and decouple the first DC bus from the load in the standby state. In at least one example, the first power device includes a first inverter and the second power device includes a second inverter, the instructions further instructing the at least one processor to control, in the mains mode of operation, the first inverter to be in an active state and provide output power to a load, and control, in the mains mode of operation, the second inverter to be in a standby state and decouple the second DC bus from the load in the standby state.

Examples of the disclosure include a method for controlling a power system comprising a first power device having a first converter and a first DC bus and a second power device having a second converter and a second DC bus, the second power device being coupled in parallel with the first power device, the method comprising controlling, in a mains mode of operation, the first power device to be in an active state, controlling the first converter to maintain the first DC bus at an active voltage in the active state of the first power device, controlling, in the mains mode of operation, the second power device to be in a standby state, controlling the second converter to maintain the second DC bus at a standby voltage higher than the active voltage in the standby state of the second power device, and controlling the second converter to transition from the standby state to the active state responsive to initiating a transition from the mains mode of operation to a backup mode of operation.

In at least one example, the power system further includes a plurality of relays switchably coupled to an AC mains and at least one energy-storage device, the method further comprising controlling the plurality of relays to couple the AC mains to the first power device and the second power device during the mains mode of operation. In at least one example, the first power device further includes a first inverter and the second power device further including a second inverter, the power system further comprising a plurality of relays coupled to the first power device and the second power device and each switchably coupled to an AC mains and at least one energy-storage device, the method further comprising controlling, in the mains mode of operation, the first inverter to provide output power to a load in the active state, controlling, in the mains mode of operation, the second inverter to decouple the second DC bus from the load in the standby state, transitioning from the mains mode of operation to the backup mode of operation, controlling, responsive to initiating a transition to the backup mode of operation, the plurality of relays to transition from coupling the AC mains to the first converter and the second converter to coupling the at least one energy-storage device to the first converter and the second converter, and controlling, responsive to controlling the plurality of relays to transition, the second inverter to be in the active state and provide output power to the load. In at least one example, the method further includes controlling, responsive to controlling the plurality of relays to transition, the first inverter to be in the standby state and not provide output power to the load.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements, and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Figure 1:
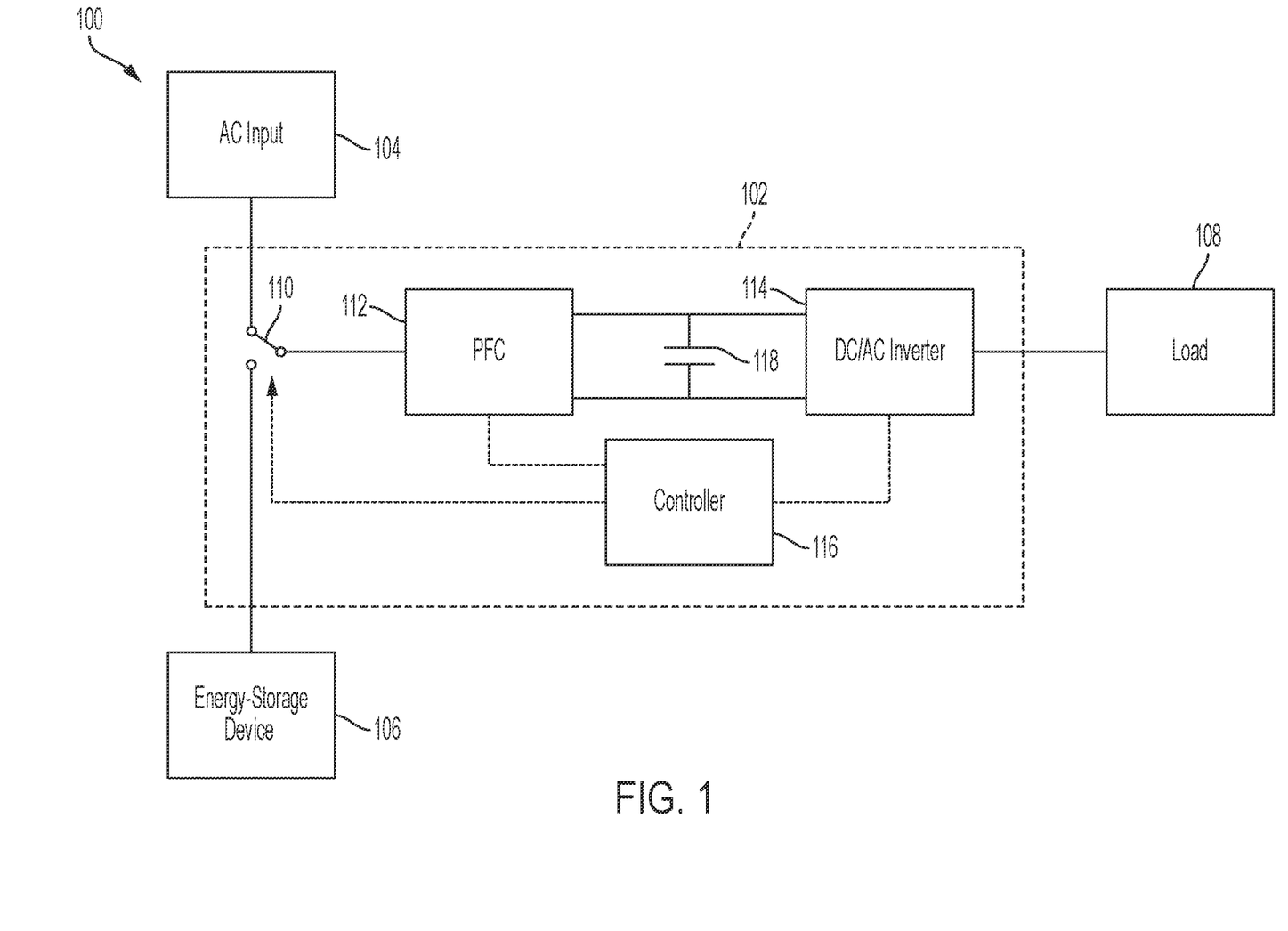
FIG. 1 illustrates a block diagram of a power system according to an example.

As discussed above, power devices such as UPSs and UPS power modules may be used to provide power to one or more loads. For example, FIG. 1 illustrates a block diagram of a power system 100 according to an example. The power system 100 includes a power device 102, an AC input 104, an energy-storage device 106, and a load 108. The power device 102 may be a UPS in some examples. In other examples, the power device 102 may be a power module within a UPS, potentially in combination with (for example, coupled in parallel with) other power modules in the UPS. In still other examples, the power device 102 may be another type of device to provide power. The power device 102 includes a relay 110, a power-factor-correction circuit 112 ("PFC 112"), a DC/AC inverter 114, at least one controller 116 ("controller 116"), and at least one capacitor 118 ("capacitor 118").

In various examples, the controller 116 may be internal or external to the power device 102. For example, in at least one example in which the power device 102 is a UPS, the controller 116 may be internal to the power device 102. In at least one example in which the power device 102 is one of several power modules inside a UPS, the controller 116 may be external to the power device 102 and may be coupled to each of the power modules. In still other examples, the power device 102 may be one of several power modules inside a UPS that includes a primary controller coupled to each power module, each including a respective individual controller represented by the controller 116 and being coupled to the primary controller. In still other examples, other configurations may be implemented.

The power device 102 may provide output power to the load 108. The power device 102 may draw input power from the AC input 104 or the energy-storage device 106. The AC input 104 may be, for example, a utility mains supply configured to provide mains power to the power device 102. The energy-storage device 106 may be, for example, a battery configured to provide backup power if the AC input 104 is unavailable.

For example, if the AC input 104 is providing acceptable input power (that is, power having parameters such as voltage or current within an acceptable range of values), then the power device 102 may operate in a mains mode of operation. In the mains mode of operation, the power device 102 may draw input power from the AC input 104. The controller 116 may control the relay 110 to couple the AC input 104 to the PFC 112. The controller 116 may control the PFC 112 to draw AC power from the AC input 104, convert the AC power to DC power, and provide the DC power to the capacitor 118. The controller 116 may control the DC/AC inverter 114 to draw DC power from the capacitor 118, convert the DC power to AC power, and provide the AC power to the load 108.

The power device 102 may continue providing output power derived from the AC input 104 to the load 108 as long as acceptable AC input power is available and the load 108 draws power. If the controller 116 determines that the AC input power is no longer acceptable, then the power device 102 may initiate a transition to a backup mode of operation. In the backup mode of operation, the power device 102 may draw power from the energy-storage device 106 instead of the AC input 104 (which may no longer have any acceptable AC power available). To transition a power source from the AC input 104 to the energy-storage device 106, the controller 116 may control the relay 110 to switch, beginning a transition to coupling the PFC 112 to the energy-storage device 106 instead of the AC input 104. Once the relay 110 transition is complete, the controller 116 may control the PFC 112 to draw power from the energy-storage device 106 instead of the AC input 104, and otherwise control the PFC 112 and DC/AC inverter 114 in the manner discussed above to power the load 108.

In this manner, the power device 102 may power the load 108 using either the AC input 104 (for example, in the mains mode of operation) or the energy-storage device 106 (for example, in the backup mode of operation). Although the power system 100 is illustrated having a single power device 102, in some examples, a power system may include multiple power devices connected in parallel. Parallel-connected power devices may provide power to a load simultaneously in some examples; in other examples, one or more of the parallel-connected power devices may power a load while the remaining parallel-connected power devices remain in a standby state. In the standby state, the power device may not be operated to provide power to a load. For example, if the power device includes an output inverter, the inverter may not be operated to provide output AC power to a load.

Figure 2:
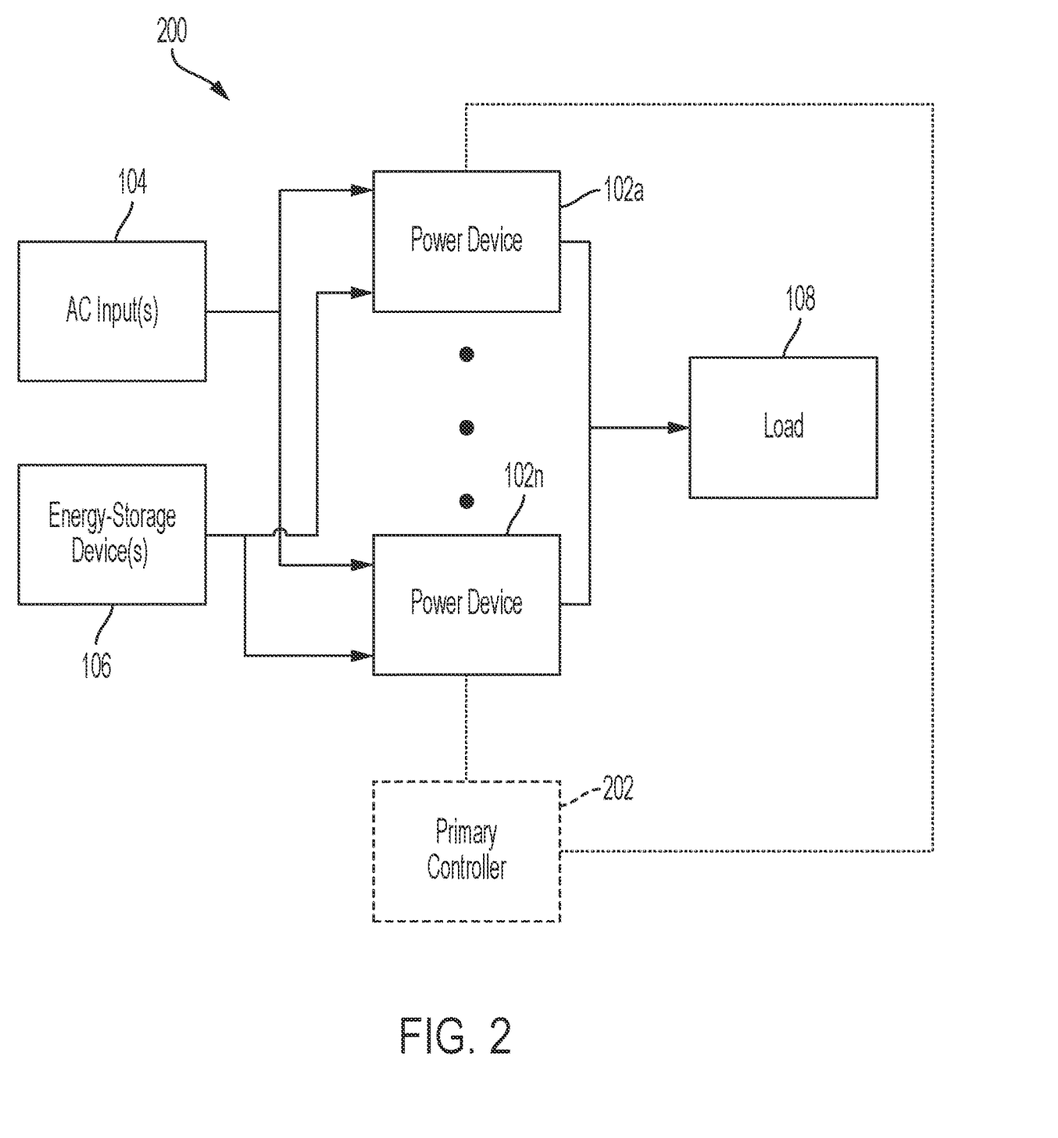
FIG. 2 illustrates a block diagram of a power system according to another example.

For example, FIG. 2 illustrates a power system 200 that includes an arbitrary number of two or more power devices 102a-102n. In some examples, each of the power devices 102a-102n may be a UPS coupled in parallel with each other UPS. In various examples, each of the power devices 102a-102n may be a power module of a single UPS that includes all of the power devices 102a-102n.

In some examples, the AC input 104 includes a single AC mains power supply coupled to each of the power devices 102a-102n. In other examples, the AC input 104 may include multiple AC mains connections each coupled to a respective one or more of the power devices 102a-102n. Similarly, in some examples, the energy-storage device 106 may include a single energy-storage device coupled to each of the power devices 102a-102n, whereas in other examples, the energy-storage device 106 may include multiple energy-storage devices each coupled to one or more of the power devices 102a-102n.

In some examples, each of the power devices 102a-102n may be a UPS coupled in parallel with each other UPS. In other examples, each of the power devices 102a-102n may be a power module within a single UPS. For example, the power system 200 may include a single UPS including multiple power devices 102a-102n, each of which is a power module. In still other examples, other configurations and implementations may be realized.

In various examples, each of the power devices 102a-102n may have a structural implementation as shown in FIG. 1. In some examples, however, the power devices 102a-102n may differ depending on what type of power device the power devices 102a-102n are. For example, if the power devices 102a-102n are each UPSs, the power devices 102a-102n may include the components shown in FIG. 1. In another example, if the power devices 102a-102n are each power modules, the power system 200 may include an optional primary controller 202 coupled to each of the power devices 102a-102n. In this example, each of the power devices 102a-102n may include a secondary controller (for example, the controller 116), or may not include a controller. The primary controller 202 may be coupled to the secondary controllers.

The power devices 102a-102n are configured to provide power to the load 108. In some examples, multiple power devices 102a-102n are coupled to the load 108 because the load 108 may have a high power rating that exceeds the power output rating of any individual one of the power devices 102a-102n. In many examples, however, multiple power devices 102a-102n are provided simply to offer redundancy to the load 108. For example, a single one of the power devices 102a-102n may be capable of satisfying the power requirements of the load 108. The remaining power devices 102a-102n may be provided to share in providing power to the load 108 in some examples, or may be provided as redundancies in other examples. The redundant power devices 102a-102n may provide power if the active power device fails, or if maintenance needs to be performed on the active power device, or in response to some other condition. Accordingly, if a single one of the power devices 102a-102n is capable of powering the load 108 (that is, if the power draw of the load 108 is less than the rated power of one of the power devices 102a-102n), the remaining power devices 102a-102n may remain in a standby condition. For example, if the maximum power draw of the load 108 is 3 W, and each of the power devices 102a-102n is rated to provide 5 W, only a single one of the power devices 102a-102n needs to provide power to the load 108 to satisfy the power draw of the load 108.

Accordingly, the power devices 102a-102n may provide uninterrupted power to the load 108. In various examples, one of the power devices 102a-102n may act as a primary active power device providing power to the load 108, and the remaining power devices 102a-102n may act as redundant standby power devices. If AC power fails, the power devices 102a-102n may switch from providing power derived from the AC input 104 to power derived from the energy-storage device 106. If an active power device fails, one of the redundant, standby power devices may be activated to power the load 108. Accordingly, the power devices 102a-102n provide uninterrupted, redundant power to the load 108.

However, the relay 110 may be a mechanical relay in some examples. Mechanical relays may take several milliseconds (for example, up to 20 ms in some examples) to transition from coupling the PFC 112 to the AC input 104 (for example, in a mains mode of operation) to coupling the PFC 112 to the energy-storage device 106 (for example, in a backup mode of operation) when transitioning from the AC input 104. That is, even when the power system 100 initiates a transition from the mains mode of operation to the backup mode of operation, the transition may take several milliseconds to complete.

During this transition time, the DC/AC inverter 114 of the active power device may continue to draw DC power from the capacitor 118. Even though the transition time of the relay 110 is only a few milliseconds, the capacitor 118 may not normally store enough energy to satisfy the power draw of the DC/AC inverter 114 during the transition. That is, the energy that would normally be drawn by the load 108 during the several-millisecond transition time may exceed the amount of energy normally stored in the capacitor 118.

Nonetheless, it may be desirable for the capacitor 118 to provide the energy needed by the load 108. Accordingly, the capacitor 118 may be charged to a higher voltage than would otherwise be necessary (for example, than would otherwise be necessary to provide power to the DC/AC inverter 114 outside of the transition time) to store additional energy, thereby ensuring that sufficient energy is available during the transition time of the relay 110. In other examples, additional capacitors may be coupled in parallel with the capacitor 118 to store additional energy.

Charging the capacitor 118 to a higher voltage may introduce several challenges. For example, a higher bus voltage (that is, a voltage on the bus connecting the capacitor 118 to the PFC 112 and the DC/AC inverter 114) may increase switching losses in the PFC 112 and the DC/AC inverter 114. Furthermore, core losses, copper losses, and ripple current may be increased in the DC/AC inverter 114. Losses may also be increased in other components of the power device 102 not explicitly shown, such as a logic power supply (LPS), a charger, sensing circuitry, and so forth. Although additional capacitors may be coupled in parallel with the capacitor 118 in some examples (for example, rather than charging the capacitor 118 to a higher voltage), adding additional capacitors may increase the size and cost of the power device 102.

Accordingly, certain power devices may operate with increased losses to ensure that power is available to a load during a relay transition. In some examples, multiple power devices are connected in parallel. At least one first power device may operate in an active mode and provide power to a load. The capacitor and DC bus of the active power device may be maintained at a relatively low voltage. For example, the capacitor and DC bus may be maintained at a voltage approximately equal to, or slightly higher than, the minimum voltage to operate an output power converter (for example, an inverter) properly. At least one second power device may operate in a standby mode and not provide power to the load. Instead, the at least one second power device may remain in standby waiting to provide power to the load in the event of a relay transition. The capacitor and DC bus of the standby power device may be maintained at a relatively high voltage. For example, the capacitor may be charged to a high enough voltage that the energy stored in the capacitor is sufficient to power the load during the relay transition, which may be the highest voltage level that the standby power device can support in some examples. However, because the standby power device is not providing power to a load, the losses discussed above may not be present or reduced substantially. Examples discussed herein thus provide power to a load without interruption and with minimized losses.

Figure 3:
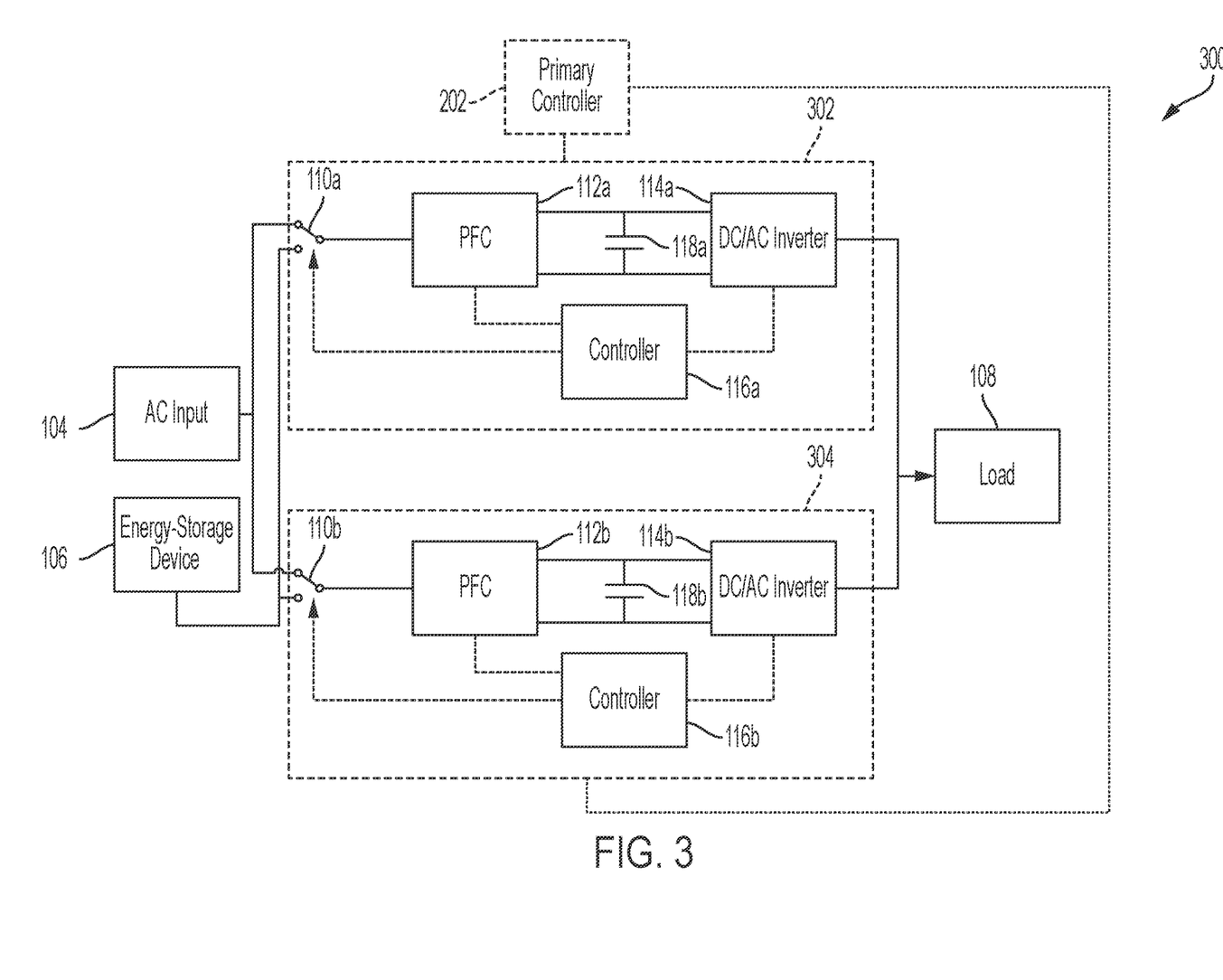
FIG. 3 illustrates a block diagram of a power system according to another example.

FIG. 3 illustrates a block diagram of a power system 300 according to an example. The power system 300 may be an example of the power system 200 in which the power devices 102a-102n comprise two power devices, including a first power device 302 and a second power device 304. The first power device 302 includes a first relay 110a, a first PFC 112a, a first DC/AC inverter 114a, a first controller 116a, and a first capacitor 118a. The second power device 304 includes a second relay 110b, a second PFC 112b, a second DC/AC inverter 114b, a second controller 116b, and a second capacitor 118b.

The power system 300 may be operated such that, in light-load conditions, one of the power devices 302, 304 acts as an active power device to power the load 108, and the other of the power devices 302, 304 acts as a standby power device to provide power to the load 108 at least during a transition from the AC input 104 to the energy-storage device 106. Accordingly, at any given time while the relays 110a, 110b are in a static (that is, not transitioning) state, only one of the power devices 302, 304 actively powers the load, while the other of the power devices 302, 304 operates in a standby state. Light-load conditions may include conditions in which the power draw of the load 108 may be satisfied by fewer than all of the power devices 102a-102n. For example, light-load conditions may include a condition in which the power draw of the load 108 is less than the power rating of at least one of the power devices 302, 304, such that only one of the power devices 302, 304 needs to actively power the load 108 in order to satisfy the load 108.

Figure 4:
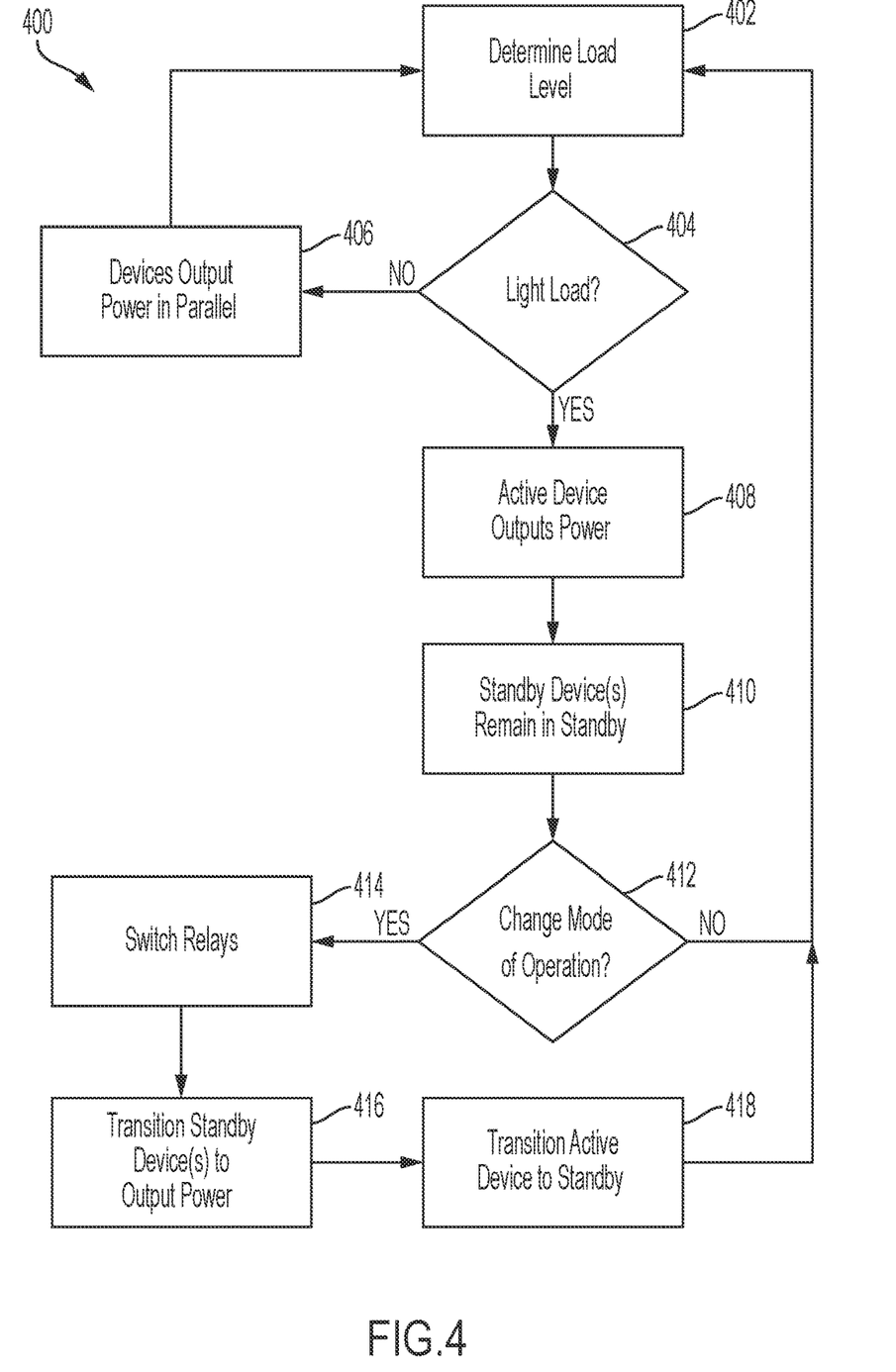
FIG. 4 illustrates a process of controlling a power system according to an example.

FIG. 4 illustrates a process 400 of operating the power system 300 according to an example. In some examples, the process 400 may be executed at least in part by each of the controllers 116a, 116b. In various examples, the optional primary controller 202 may be implemented and may execute at least a portion of the process 400. In still other examples, one of the controllers 116a, 116b may act as a leader controller and the other of the controllers 116a, 116b may act as a follower controller (including, for example, if the optional primary controller 202 is omitted). For purposes of example, the process 400 may begin at a time which power is available from the AC input 104.

At act 402, a determination of the load level is made. Act 402 may be executed by the first controller 116a, the second controller 116b, the primary controller 202, a combination thereof, and so forth. Determining the load level may include determining a power drawn by the load 108. In some examples, the controllers 116a, 116b may directly sense (for example, via one or more current and/or voltage sensors) an amount of power drawn by the load 108. In other examples, the controllers 116a, 116b may communicate with the load 108 to query the load 108 for power-consumption information.

At act 404, a determination is made as to whether the load is considered light. A light load may be a load that can be satisfied by fewer than all of the power devices in a system. For example, in the power system 300, a light load may be a load that can be satisfied by one of the power devices 302, 304. Act 404 may be executed by either or both of the controllers 116a, 116b, and/or by the primary controller 202. If the load is not a light load (404 NO), then the process 400 continues to act 406.

At act 406, both of the power devices 302, 304 output power to the load 108 in parallel. For example, the controllers 116a, 116b may control the PFCs 112a, 112b and the DC/AC inverters 114a, 114b to draw power from the AC input 104 and provide output power to the load 108. Because the power devices 302, 304 provide power to the load 108 in parallel, the combined output power may be sufficient to satisfy even a non-light load. Returning to act 404, if the load is a light load (404 YES), then the process 400 continues to act 408.

At act 408, an active power device outputs power to the load 108. Which one of the power devices 302, 304 is operated as an active power device may be arbitrarily selected, such as randomly, pursuant to a hierarchy or predetermined list, based on a selection by a user, based on a remaining life of the devices, or based on some other scheme. For purposes of example, the first power device 302 may be operated as an active power device. As the active power device, the first power device 302 is operated to provide output power to the load 108. For example, the first controller 116a may control the first PFC 112 to draw AC power from the AC input 104, convert the AC power to DC power, and provide the DC power to the first capacitor 118a. The first controller 116a may control the PFC 112a to maintain the voltage on the capacitor 118a at a relatively low voltage, such as approximately 190 V. The first controller 116a may further control the DC/AC inverter 114a to draw DC power from the first capacitor 118a, convert the DC power to AC power, and provide the AC power to the load 108. Because the load is a light load, the first power device 302 may be capable of satisfying the load requirements alone.

At act 410, a standby power device remains in standby and does not provide output power to the load 108. Which one of the power devices 302, 304—is operated as a standby power device may be arbitrarily selected, and may include the power device that is not the active power device. For example, the second power device 304 may be operated as a standby power device. As the standby power device, the second power device 304 is operated to not provide output power to the load 108, but stands by to power the load 108 if power becomes unavailable from the AC input 104. For example, the second controller 116a may control the second PFC 112b to continue drawing power form the AC input 104 as necessary to charge the second capacitor 118b (for example, to maintain a desired voltage across the capacitor 118b), but may not operate the second inverter 114b to draw power from the second capacitor 118b.

As discussed above, the capacitor of the active power device (for example, the first capacitor 118a) may be maintained at a relatively low voltage. For example, the voltage may be a voltage that enables the first power device 302 to power the load 108, such as approximately 190 V. The capacitor of the standby power device (for example, the second capacitor 118b) may be maintained at a relatively high voltage. For example, the voltage may be a voltage that enables the second power device 304 to load the load 108 during a relay transition using the energy stored in the second capacitor 118b, such as approximately 225 V. The extra energy stored in the second capacitor 118b by virtue of the higher voltage may be sufficient to power the load 108 during transition of the relays 110a, 110b if a power-source transition becomes necessary.

At act 412, a determination is made as to whether to change a mode of operation. For example, a determination may be made as to whether to transition from a mains mode of operation to a backup mode of operation, or from a backup mode of operation to a mains mode of operation. The power system 300 may operate in the mains mode of operation when acceptable AC power is available from the AC input 104. The power system 300 may transition to the backup mode of operation when acceptable AC power is no longer available from the AC input 104.

Because acceptable AC power is available from the AC input 104 during the presently described iteration, act 412 includes determining whether acceptable AC power is no longer available from the AC input 104. If acceptable AC power is no longer available from the AC input 104, then the power system 300 may initiate a transition from the mains mode of operation to the backup mode of operation. Conversely, if acceptable AC power were not available prior to executing act 412, then act 412 would include determining whether acceptable AC power has become available. If acceptable AC power becomes available from the AC input 104, then the power system 300 may initiate a transition from the backup mode of operation to the mains mode of operation.

The determination may be made by the primary controller 202 and/or the controllers 116a, 116b. Acceptable AC power may include power that has power characteristics, such as current and/or voltage levels, within accepted ranges. Accordingly, if the AC input 104 is providing AC power having a voltage level outside of an accepted range of values, then acceptable AC power may not be available.

If there is no change in power availability, such as because acceptable AC power remains available, then the power system 300 does not change a mode of operation (412 NO). The process 400 then returns to act 402. Acts 402-412 may be repeatedly executed, during which time the first power device 102a remains active and powers the load 108 while the second power device 102b remains in standby without powering the load 108. As noted above, the second power device 102b may maintain the second capacitor 118b at a high voltage level, but may control the second DC/AC inverter 114b to disconnect the second capacitor 118b from the load 108 to avoid discharging the second capacitor 118b to the load 108.

If there is a change in power availability, then the power system 300 initiates a change in a mode of operation (412 YES) and the process 400 continues to act 414. For example, if acceptable mains power is no longer available due to a blackout condition, then the power system 300 may initiate a change in a mode of operation from the mains mode of operation to the backup mode of operation.

At act 414, the relays 110a, 110b begin to switch to couple the PFCs 112a, 112b to the energy-storage device 106 rather than the AC input 104 responsive to initiating the transition from the mains mode of operation to the backup mode of operation. For example, the controllers 116a, 116b may control the relays 110a, 110b, respectively, to switch. As noted above, however, the switching process is not instantaneous and may take several milliseconds to complete.

At act 416, the second power device 102b transitions from acting as a standby device to actively providing power to the load 108 as an active device responsive to initiating the transition from the mains mode of operation to the backup mode of operation. For example, the second controller 116b may control the DC/AC inverter 114b to begin drawing DC power from the second capacitor 118b, convert the DC power to AC power, and provide the AC power to the load 108. As discussed above, the second capacitor 118b may have been previously charged to a higher voltage to enable the second capacitor 118b to power the load 108 during the transition of the second relay 110b. Because the second inverter 114b may be implemented with electronic switches, such as FETs, rather than mechanical switches, such as relays, the second inverter 114b may change from disconnecting the second capacitor 118b from the load 108 (for example, while the second inverter 114b is in standby) to providing power derived from the second capacitor 118b to the load 108 much more quickly than the second relay 110b is able to complete a transition.

Even after the transition of the second relay 110b is complete, the second power device 102b may continue to act as an active device by powering the load 108. Because the second power device 102b is an active device, the second controller 116b may control the second PFC 112b to charge the second capacitor 118b to a lower voltage level than in the standby state (for example, 190 V rather than 225 V).

At act 418, the first power device 102a transitions from acting as an active device to instead act as a standby device responsive to initiating the transition from the mains mode of operation to the backup mode of operation. For example, the first controller 116a may control the first inverter 114a to disconnect the first capacitor 118a from the load 108. The first controller 116a may also control the first PFC 112a to charge the first capacitor 118a to a desired voltage level, which may be higher than the voltage level of the second capacitor 118b. That is, because the first power device 102a is now acting as a standby device, the first capacitor 118a may be maintained at a higher voltage level than previously (for example, 225 V rather than 190 V).

Once the execution of acts 414-418 is complete (for example, because the relays 110a, 110b have completed switching, the second power device 102b has fully transitioned to acting as an active device, and the first power device 102a has fully transitioned to acting as a standby device), the power system 300 may be considered to have completed the transition from one mode of operation to another (for example, transitioning from a mains mode of operation to a backup mode of operation).

The process 400 then returns to act 402, and acts 402-412 may be repeated. In this iteration, act 408 may include the second power device 102b acting as an active power device, and act 410 may include the first power device 102a acting as a standby power device. Act 412 may include determining whether there has been a change in availability of acceptable AC power, that is, whether acceptable AC power has again become available from the AC input 104. If not (412 NO), acts 402-412 are repeated. If acceptable AC power is available (412 YES), then the process 400 continues to act 414. Acts 414-418 are repeated again, with the first power device 102a again transitioning to act as an active power device and the second power device 102b again transitioning to act as a standby power device.

Although acts 414-418 are illustrated as occurring in series, in various examples certainly acts may be executed simultaneously and/or in parallel. For example, acts 408 and 410 may be executed substantially simultaneously in some examples. Similarly, acts 414-418 may be executed substantially simultaneously in some examples. In some examples, however, act 418 may be executed after acts 414 and 416 (which may be executed substantially simultaneously in some examples). For example, while the relays 110a, 110b transition at act 414, the active power device that is planned to transition to a standby state may not disable its inverter until after the relay transition is complete. During the transition time, the inverter of the power device may continue to discharge the capacitor to power the load 108, and the inverter may only be deactivated once the relay transition is complete.

Acts of the process 400 may be executed by the first controller 116a, the second controller 116b, the primary controller 202, and/or a combination thereof. Which of the controllers 116a, 116b, 202 executes which of the acts of the process 400 may depend at least in part on the implementation of the power system 300 and the power devices 302, 304. For example, if the power system 300 is a UPS system and the power devices 302, 304 are individual power modules within the power system 300, the primary controller 202 may be implemented. Conversely, if the power devices 302, 304 are each UPSs, the primary controller 202 may be omitted. One of the controllers 116a, 116b may act as a leader controller, and the other may act as a follower controller.

In some examples, the leader controller or primary controller 202 may execute act so the process 400 such as determining a load level at act 402, determining whether the load is light at act 404, selecting which of the power devices is an active device and which is a standby device at acts 408 and 410, and so forth. In various examples, the controllers 116a, 116b may control the respective power devices 302, 304 for operations such as controlling the converters 112a, 112b and inverters 114a, 114b.

As noted above, in some examples, the power devices 102a-102n may be power modules within a single UPS. In some examples, rather than each of the power devices 102a-102n including a respective relay 110a, 110b, the power system 100 may include a single relay to route power from the AC input 104 and/or the energy-storage device 106 to the power devices 102a, 102b.

Figure 5:
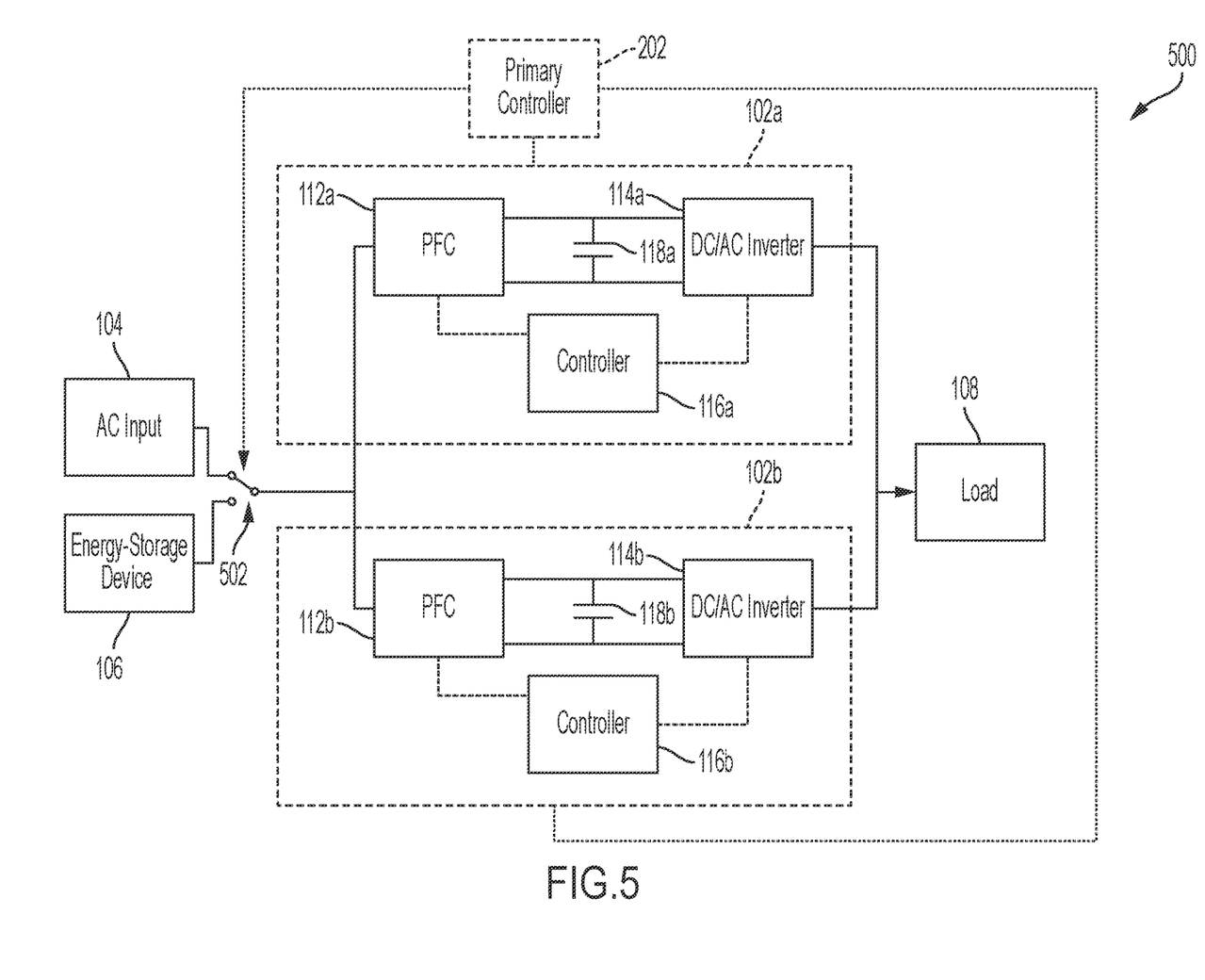
FIG. 5 illustrates a block diagram of a power system according to another example.

For example, FIG. 5 illustrates a block diagram of a power system 500 according to an example. The power system 500 is substantially identical to the power system 300; however, rather than the power devices 102a, 102b including the relays 102a, 102b, the power system 500 includes a single relay 502. The relay 502 is switchably coupled to the AC input 104 at a first connection, is switchably coupled to the energy-storage device 106 at a second connection, and is coupled to the PFCs 112a, 112b at a second connection. The relay 502 may be communicatively coupled to the primary controller 202, which controls the switching state of the relay 502. In some examples (for example, in some examples in which the primary controller 202 is omitted), the relay 502 may be communicatively coupled to and controlled by the controllers 116a, 116b in addition to, or in lieu of, the primary controller 202.

As noted above at least with respect to FIG. 2, the power system 200 may include an arbitrary number of power devices 102a-102n. Accordingly, in some examples, power systems may include more than two power devices 102a, 102b, some of which may be active power devices and some of which may be standby power devices under light-load conditions, such as conditions in which fewer than all of the power devices are needed to satisfy the remand of the load 108. In various examples, a number of the power devices 102a-102n that is active may be the minimum number of power devices needed to satisfy the demand of the load 108, and the remaining power devices may be standby devices. In other examples, other schemes may be implemented to select how many of the power devices 102a-102n are active and how many are in standby.

Various controllers, such as the controllers 116a, 116b, 202, may execute various operations discussed above. The controllers 116a, 116b, 202 also execute one or more instructions stored on one or more non-transitory computer-readable media (for example, memory and/or storage), which the controllers 116a, 116b, 202 may include and/or be coupled to, that may result in manipulated data. In some examples, the controllers 116a, 116b, 202 may include one or more processors or other types of controllers. In one example, the controllers 116a, 116b, 202 are or include at least one processor. In another example, the controllers 116a, 116b, 202 perform at least a portion of the operations discussed above using an application-specific integrated circuit tailored to perform particular operations in addition to, or in lieu of, a processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A power system comprising:
   a first power device having a first converter and a first DC bus;
   a second power device having a second converter and a second DC bus, the second power device being coupled in parallel with the first power device;
   an output configured to be coupled to a load; and
   at least one controller configured to
      control, in a mains mode of operation, the first power device to be in an active state,
      control the first converter to maintain the first DC bus at an active voltage in the active state of the first power device,
      control, in the mains mode of operation, the second power device to be in a standby state,
      control the second converter to maintain the second DC bus at a standby voltage higher than the active voltage in the standby state of the second power device, and
      control the second converter to transition from the standby state to the active state responsive to initiating a transition from the mains mode of operation to a backup mode of operation.

2. The power system of claim 1, wherein the first power device is a first uninterruptible power supply (UPS) and the second power device is a second UPS.

3. The power system of claim 1, further comprising at least one uninterruptible power supply including the first power device and the second power device, wherein the first power device is a first power module and the second power device is a second power module.

4. The power system of claim 1, further comprising a plurality of relays including:
   a first relay configured to be switchably coupled to an AC mains at a first respective connection, to be switchably coupled to at least one energy-storage device at a second respective connection, and to be coupled to the first power device at a third respective connection; and
   a second relay configured to be switchably coupled to the AC mains at a first respective connection, to be switchably coupled to the at least one energy-storage device at a second respective connection, and to be coupled to the second power device at a third respective connection.

5. The power system of claim 4, wherein the at least one controller is configured to control the plurality of relays to couple the AC mains to the first power device and the second power device during the mains mode of operation.

6. The power system of claim 4, wherein the first power device includes a first inverter and the second power device includes a second inverter, and wherein the at least one controller is further configured to:
   control, in the mains mode of operation, the first inverter to provide output power to the load in the active state;
   control, in the mains mode of operation, the second inverter to decouple the second DC bus from the load in the standby state;
   transition from the mains mode of operation to the backup mode of operation;

control, responsive to initiating a transition to the backup mode of operation, the plurality of relays to transition from coupling the AC mains to the first converter and the second converter to coupling the at least one energy-storage device to the first converter and the second converter; and control, responsive to controlling the plurality of relays to transition, the second inverter to be in the active state and provide output power to the load.

7. The power system of claim 6, wherein the at least one controller is further configured to control, responsive to controlling the plurality of relays to transition, the first inverter to be in the standby state and decouple the first DC bus from the load.

8. The power system of claim 1, wherein the first power device includes a first inverter and the second power device includes a second inverter, and wherein the at least one controller is further configured to:

control, in the mains mode of operation, the first inverter to provide output power to the load in the active state; and control, in the mains mode of operation, the second inverter to decouple the second DC bus from the load in the standby state.

9. The power system of claim 8, wherein controlling the first inverter to be in the active state includes controlling one or more switching devices of the first inverter to draw DC power from the first DC bus and provide output AC power derived from the DC power to the load.

10. The power system of claim 8, further comprising a plurality of relays switchably coupled to a first input power source and a second input power source, wherein the at least one controller is further configured to control the first inverter to be in the standby state responsive to controlling the plurality of relays to switch from the first input power source to the second input power source.

11. The power system of claim 10, wherein the at least one controller is further configured to control the second inverter to be in the active state responsive to controlling the plurality of relays to switch from the first input power source to the second input power source.

12. At least one non-transitory computer-readable medium storing thereon sequences of computer-executable instructions for controlling a power system comprising a first power device having a first converter and a first DC bus and a second power device having a second converter and a second DC bus, the second power device being coupled in parallel with the first power device, the sequences of computer-executable instructions including instructions that instruct at least one processor to:

control, in a mains mode of operation, the first power device to be in an active state, control the first converter to maintain the first DC bus at an active voltage in the active state of the first power device, control, in the mains mode of operation, the second power device to be in a standby state, control the second converter to maintain the second DC bus at a standby voltage higher than the active voltage in the standby state of the second power device, and control the second converter to transition from the standby state to the active state responsive to initiating a transition from the mains mode of operation to a backup mode of operation.

13. The at least one non-transitory computer-readable medium of claim 12, the power system further comprising a plurality of relays including a first relay coupled to the first power device and switchably coupled to an AC mains and at least one energy-storage device and a second relay coupled to the second power device and switchably coupled to the AC mains and the least one energy-storage device, the instructions further instructing the at least one processor to control the plurality of relays to couple the AC mains to the first power device and the second power device during the mains mode of operation.

14. The at least one non-transitory computer-readable medium of claim 12, the first power device further including a first inverter and the second power device further including a second inverter, the power system further comprising a plurality of relays coupled to the first power device and the second power device and each switchably coupled to an AC mains and at least one energy-storage device, the instructions further instructing the at least one processor to:

control, in the mains mode of operation, the first inverter to be in the active state and provide output power to a load;

control, in the mains mode of operation, the second inverter to be in the standby state and not provide output power to the load;

transition from the mains mode of operation to the backup mode of operation;

control, responsive to initiating a transition to the backup mode of operation, the plurality of relays to transition from coupling the AC mains to the first converter and the second converter to coupling the at least one energy-storage device to the first converter and the second converter; and control, responsive to controlling the plurality of relays to transition, the second inverter to be in the active state and provide output power to the load.

15. The at least one non-transitory computer-readable medium of claim 14, the instructions further instructing the at least one processor to control, responsive to controlling the plurality of relays to transition, the first inverter to be in the standby state and decouple the first DC bus from the load in the standby state.

16. The at least one non-transitory computer-readable medium of claim 12, wherein the first power device includes a first inverter and the second power device includes a second inverter, the instructions further instructing the at least one processor to control, in the mains mode of operation, the first inverter to be in the active state and provide output power to a load; and control, in the mains mode of operation, the second inverter to be in the standby state and decouple the second DC bus from the load in the standby state.

17. A method for controlling a power system comprising a first power device having a first converter and a first DC bus and a second power device having a second converter and a second DC bus, the second power device being coupled in parallel with the first power device, the method comprising:

controlling, in a mains mode of operation, the first power device to be in an active state;

controlling the first converter to maintain the first DC bus at an active voltage in the active state of the first power device;

controlling, in the mains mode of operation, the second power device to be in a standby state;

controlling the second converter to maintain the second DC bus at a standby voltage higher than the active voltage in the standby state of the second power device; and controlling the second converter to transition from the standby state to the active state responsive to initiating a transition from the mains mode of operation to a backup mode of operation.

18. The method of claim 17, the power system further comprising a plurality of relays switchably coupled to an AC mains and at least one energy-storage device, the method further comprising controlling the plurality of relays to couple the AC mains to the first power device and the second power device during the mains mode of operation.

19. The method of claim 17, the first power device further including a first inverter and the second power device further including a second inverter, the power system further comprising a plurality of relays coupled to the first power device and the second power device and each switchably coupled to an AC mains and at least one energy-storage device, the method further comprising:

controlling, in the mains mode of operation, the first inverter to provide output power to a load in the active state;

controlling, in the mains mode of operation, the second inverter to decouple the second DC bus from the load in the standby state;

transitioning from the mains mode of operation to the backup mode of operation;

controlling, responsive to initiating a transition to the backup mode of operation, the plurality of relays to transition from coupling the AC mains to the first converter and the second converter to coupling the at least one energy-storage device to the first converter and the second converter; and controlling, responsive to controlling the plurality of relays to transition, the second inverter to be in the active state and provide output power to the load.

20. The method of claim 19, the method further comprising controlling, responsive to controlling the plurality of relays to transition, the first inverter to be in the standby state and not provide output power to the load.

* * * * *